Mar. 27, 1923.　　　　　　　　　　　　　　　　　　　　　1,449,432.
O. L. MASON.
HEADLIGHT CONTROLLING MECHANISM.
FILED OCT. 17, 1921.
2 SHEETS—SHEET 1.
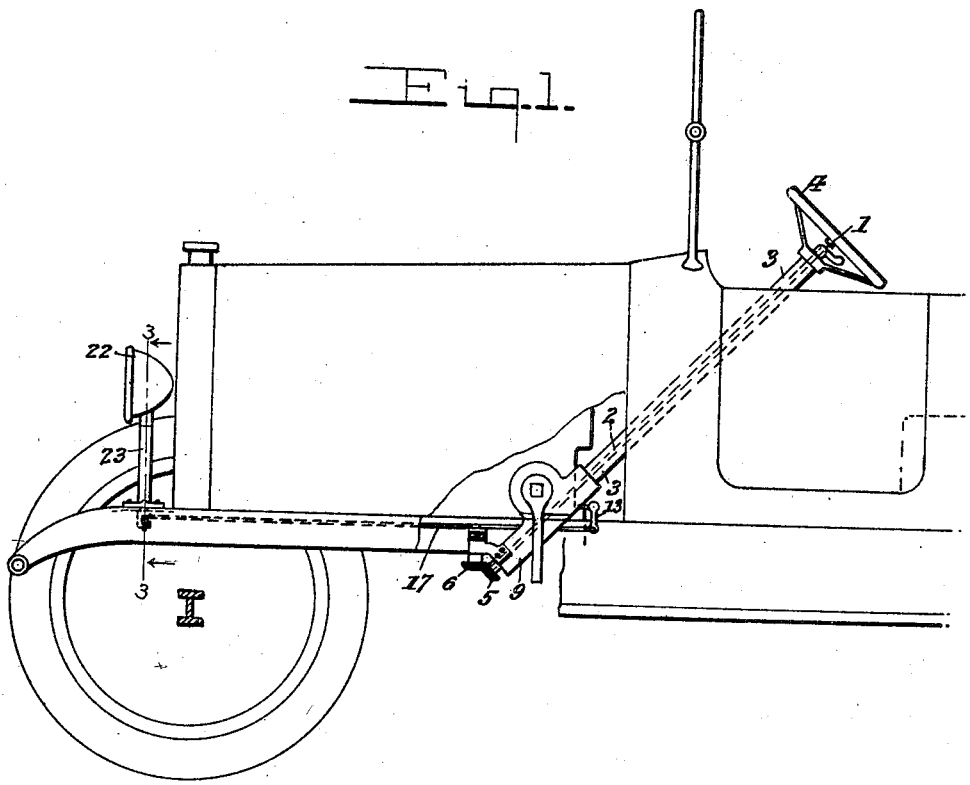
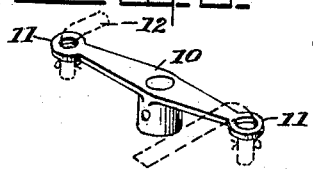
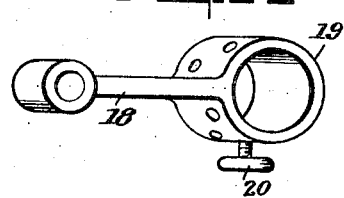
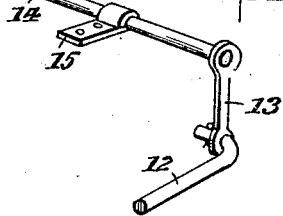
INVENTOR.
O. L. Mason
BY William J. Jacobi
ATTORNEY.

Mar. 27, 1923.

O. L. MASON.
HEADLIGHT CONTROLLING MECHANISM.
FILED OCT. 17, 1921.

INVENTOR.
O. L. Mason
BY William J. Jacobi
ATTORNEY.

Patented Mar. 27, 1923.

1,449,432

UNITED STATES PATENT OFFICE.

OSCAR L. MASON, OF MAYFIELD, KENTUCKY.

HEADLIGHT-CONTROLLING MECHANISM.

Application filed October 17, 1921. Serial No. 508,215.

*To all whom it may concern:*

Be it known that OSCAR L. MASON, a citizen of the United States, residing at Mayfield, in the county of Graves and State of Kentucky, has invented certain new and useful Improvements in Headlight-Controlling Mechanism, of which the following is a specification.

This invention has relation to certain new and useful improvements in a headlight controlling mechanism for motor vehicles and the like and has for its primary object, the provision of a mechanism which may be employed for turning the headlights to either side independently of the steering mechanism and without inconvenience to the operator.

Another object of the invention resides in the provision of a mechanism of the character stated which will be of simple construction and arrangement and which may be applied to various forms of motor vehicles without material alterations in the steering mechanism or any other parts of the vehicles.

A further object of the invention resides in the provision of a mechanism of the character stated in which the controlling lever may be mounted upon the steering wheel or the steering column so as to be within ready reach of the operator for quick operation when passing another vehicle or driving near the edge of a rough road or when approaching a dangerous crossing or in fact at any time when the driver may desire to direct the light upon the surface of the side of the road.

A still further object of the invention resides in the provision of a mechanism of the character stated which will be of such construction and arrangement that the headlights of the vehicle may be turned readily to either side or to direct the light in a straight line ahead of the vehicle and thereby give a better illumination of the surface ahead of and to the sides of the vehicle without the necessity of dimming the lights or directing them into the eyes of an operator or the occupants of a passing vehicle.

With the foregoing and other objects in view as will appear as the description proceeds the invention consists in the novel details of construction, combination and arrangement of cooperating elements as hereinafter more specifically set forth, claimed and shown in the accompanying drawings forming a part of the present application and in which:—

Figure 1 is an elevation of a portion of the conventional form of vehicle with my invention applied thereto;

Figure 5 is a detail perspective view of the cross-head for operating the headlight turn rods;

Figure 6 is a detail perspective view of one of the post controlling arms; and

Figure 7 is a detail perspective view of one end of the rock arm with one of the operating rods connected thereto.

Figure 2:
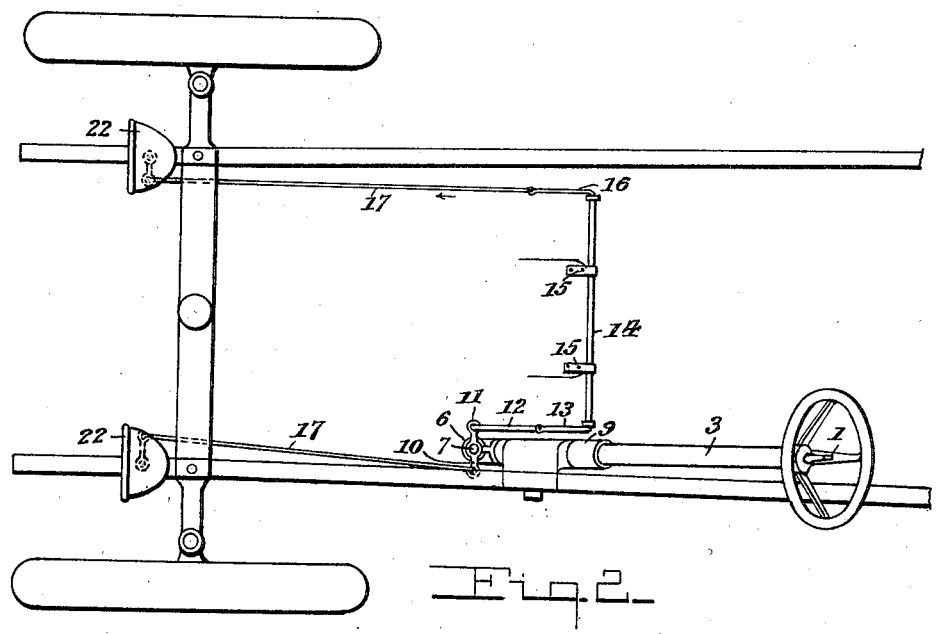
Figure 2 is a plan view of the forward portion of the chassis and a portion of the steering mechanism of the vehicle, showing my invention in its normal position.
Figure 4:
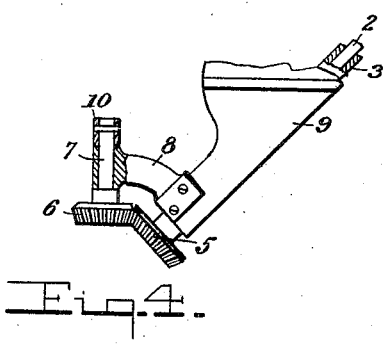
Figure 4 is an enlarged detail view of the connection between the turn rods of the mechanism.

Referring more in detail to the drawings in which similar reference characters designate corresponding parts throughout the several views, 1 indicates the operating lever which is shown as being mounted on the upper end of the main turn rod 2 extended upwardly through the steering columns 3, the operating lever 1 working over the steering wheel 4, as clearly shown in Figs. 1 and 2 of the drawings. This turn rod 2 has a bevel gear 5 or other operating gear on its lower end and meshing with a corresponding gear 6 on the lower end of the second or short turn rod 7 to operate this turn rod. The turn rod 7 is mounted in the bracket support 8 carried on the supporting structure 9 for the steering column 3, as shown in Fig. 4 of the drawings. This turn rod 7 has the cross-head 10 mounted thereon to turn with the rod 7 when the operating lever 1 is moved to either side, as will be clearly understood.

Figure 3:
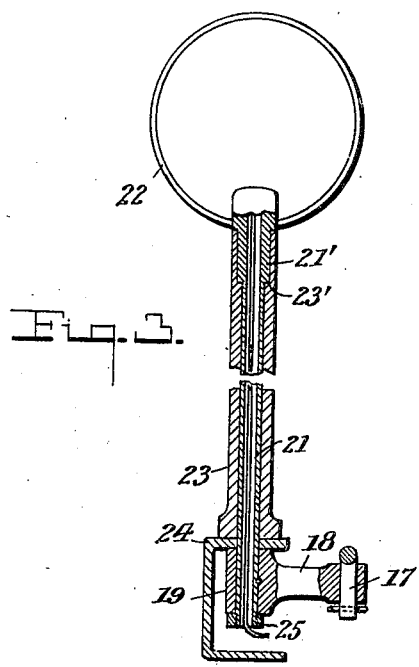
Figure 3 is an enlarged detail vertical section on the plane of line 3—3 of Fig. 1, looking in the direction indicated by the arrows.

Pivotally mounted in the eye 11 on the outer end of one arm of the cross-head 10 is the rearwardly directed rod 12 which is also pivotally connected with one arm 13 of the turn rod 14, which latter is mounted in suitable supporting brackets 15 or the like carried on a stationary part of the vehicle. This may be readily understood by referring to Fig. 2 of the drawings. The remaining arm 16 of the turn rod 14 has its forward end pivotally connected with the headlight turning rod 17 for one side of the vehicle. The remaining headlight operating rod 17 for the opposite side of the vehicle is pivotally connected at its rear end to the remaining arm of the cross head 10. Each rod 17 has its forward end loosely connected with an arm 18 projecting from and forming part of a sleeve 19 which is secured by suitable means such as the set screw 20 to the depending end of the lamp holding member 21. This lamp holding member 21 is shown as being in the form of a tube or hollow rod, having the headlight 22 upon its upper end and rotatably mounted in a bearing support or sleeve 23 resting on a frame member 24 or other portion of the vehicle chassis, and through this tube or hollow rod 21 passes the electric light wire, as shown clearly in Figure 3. The lamp holding member 21 has an enlarged upper portion 21′ seated in an enlarged portion 23 of the opening in the sleeve 23, thereby forming a better bearing or support for the lamp carrying member 21. I have also shown a stop member such as a nut 25 threaded on the lower extremity of the lamp carrying member 21. It may be also stated at this time that the arms 13 and 16 of the turn rod 14 should extend at right angles thereto, and be inclined downwardly and forwardly, so that when lever 1 is pulled downwardly, gears 5 and 6 will cause cross head 10 to pull forwardly on 12, backwardly on 17 on the left, and push forwardly on 17 on the right, so as to give proper movement to the rods 17 for turning both of the lamps 22 in the same direction. The arms 18 must also be extended properly from the lamp carrying members 21 to assure proper movement of these lamps upon operation of the lever 1. It is also evident that this mechanism may be entirely free from the steering mechanism and need not interfere with mechanism connected with the headlights for turning the same with the forward wheels. Or, if desired, this mechanism may be employed for turning the headlights with the steering mechanism by simply making a stop on the steering wheel for lever No. 1.

It is believed the complete construction and operation may now be readily understood from the foregoing paragraphs taken in connection with the accompanying drawings without further detailed description.

It may be briefly stated, however, that by operating the lever 1, the headlights 22 may be readily turned to either side without the necessity of operating the steering mechanism. If turned to the right when another car or vehicle is approaching, the headlight glare will be removed from the occupants of the approaching car and they can pass at any rate of speed desired without even dimming their headlights, and while these lights are turned to right of the road or other thoroughfare, the driver of the car can see all gulleys, ditches, creeks, bridges, and other obstructions, and can proceed at any rate of speed desired. If both cars should be equipped with this kind of light, just a little tilt to the right by each of them would remove the glare from both, and they could meet at any rate of speed desired without dimming. A return of the lever 1 to normal position will result in simultaneous return of the headlights 22 to normal position.

While the preferred embodiment of the invention has been shown and described, it is to be understood that minor changes in the details of construction may be resorted to within the scope of what is claimed without departing from the spirit of the invention.

What I claim is:—

1. The combination with an automobile including a hollow steering post and headlights, of a shaft extending through said hollow steering post and operable independent thereof, a gear wheel on the lower end of said shaft, a bracket on said steering post, a turn rod mounted in said bracket, a gear wheel on the lower end of said turn rod and meshing with the first mentioned gear wheel, a cross head on the upper end of said turn rod, and means connected to said headlights with said cross bar to operate the former simultaneously in either direction upon actuation of said shaft.

2. In combination with an automobile including a hollow steering post and headlights, of a shaft extending through said hollow steering post and operable independent thereof, a gear wheel on the lower end of said shaft, a bracket on said steering post adjacent the lower end thereof, a turn rod mounted in said bracket, a gear wheel on the lower end of said turn rod and meshing with the first mentioned gear wheel, a cross head on the upper end of said turn rod, arms extending from said headlights, operating rods connected with said arms and the outer free ends of said cross head for moving the headlights simultaneously in either direction upon actuation of said shaft.

3. A headlight controlling mechanism for motor vehicles comprising the combination with the headlights and hollow steering post, of a shaft extending through said hollow steering post and operable independent thereof, a gear wheel on the lower end of said shaft, a bracket on said steering post adjacent the lower end thereof, a turn rod mounted in said bracket, a gear wheel on the lower end of said turn rod and meshing with the first mentioned gear wheel, a cross head on the upper end of said turn rod, arms extending from said headlights, a rod connecting one of said arms to said cross head at one end thereof, the opposite end of said cross head connected to a rearwardly extending rod, the latter communicating with a transversely extending rod, an additional rod connecting said transverse rod with the other arm of the other headlight, said cross head adapted to actuate said rod whereby the headlights are simultaneously moved in either direction upon actuation of the shaft.

In testimony whereof I affix my signature.

OSCAR L. MASON.